(12) United States Patent  
Wang

(10) Patent No.: US 10,243,387 B2
(45) Date of Patent: Mar. 26, 2019

(54) METHOD AND CIRCUITRY FOR BATTERY CHARGING USING FEEDBACK VOLTAGES

(71) Applicant: NXP B.V., Eindhoven (NL)

(72) Inventor: Meng Wang, Tanggu (CN)

(73) Assignee: NXP B.V., Eindhoven (NL)

( * ) Notice: Subject to any disclaimer, the term of this patent is extended or adjusted under 35 U.S.C. 154(b) by 53 days.

(21) Appl. No.: 15/455,263

(22) Filed: Mar. 10, 2017

(65) Prior Publication Data

US 2018/0262036 A1  Sep. 13, 2018

(51) Int. Cl.
  *H02J 7/00* (2006.01)
  *G05F 1/575* (2006.01)

(52) U.S. Cl.
  CPC ............ *H02J 7/0083* (2013.01); *G05F 1/575* (2013.01)

(58) Field of Classification Search
  None
  See application file for complete search history.

(56) References Cited

U.S. PATENT DOCUMENTS

| 6,144,187 | A  | 11/2000 | Bryson |
| 9,077,198 | B2 | 7/2015 | Szepsi |
| 9,178,407 | B2 | 11/2015 | Gurlahosur |

| 2004/0164711 | A1* | 8/2004 | Hayashi | H02J 7/0055 320/134 |
| 2009/0096427 | A1* | 4/2009 | Yang | H02J 7/0077 320/162 |
| 2014/0203763 | A1 | 7/2014 | Zhao et al. | |

OTHER PUBLICATIONS

Linear Technology Corp., "LTC3555/LTC3555-X—High Efficiency USB Power Manager +Triple Step-Down DC/DC," Datasheet downloaded from <<http://www.linear.com/product/LTC3555>> on Jan. 12, 2017, 32 pages.

Linear Technology Corp., "LTC3576/LTC3576-1—Switching Power Manager with USB On-the-Go +Triple Step-Down DC/DCs," Datasheet downloaded from <<http://www.linear.com/product/LTC3576>> on Jan. 12, 2017, 48 pages.

Linear Technology Corp., "LTC4054L-42—150mA Standalone Linear Li-Ion Battery Charger in ThinSOT," Datasheet downloaded from <<http://www.linear.com/product/LTC4054L-4.2>> on Jan. 12, 2017, 16 pages.

(Continued)

*Primary Examiner* — David V Henze-Gongola

(57) ABSTRACT

Battery charger circuitry includes a linear regulator and a current control loop. The linear regulator provides a constant current to a battery while the battery charger circuitry is in a current control mode. While the battery charger circuitry is in a constant voltage mode, the current control loop to: determine whether a charging current provided to the battery is less than an end of charging reference current; in response to the charging current being less than the end of charging reference current, to place the battery charger circuitry into an end of charging state; in response to the battery charger circuitry be placed the end of charging state, and to start a timer; and in response to the timer expiring, to enter the battery charger circuitry into a done state to end charging of the battery.

20 Claims, 4 Drawing Sheets

(56) References Cited

OTHER PUBLICATIONS

Linear Technology Corp., "LTC4063—Standalone Linear Li-Ion Charger with Micropower Low Dropout Linear Regulator," Datasheet downloaded from <<http://www.linear.com/product/LTC4063>> on Jan. 12, 2017, 20 pages.

Maxim Integrated Products, "Cost-Saving Multichemistry Battery-Charger System," Doc. 19-1121, Rev. 0; Sep. 1996; 12 pages.

Texas Instruments, "Single-Chip Charge and System Power-Path Management IC," bq24030-Q1/bq24031-Q1; SLUS793B, Apr. 2008, Revised Oct. 2009; 35 pages.

Texas Instruments, "bq2407x 1.5-A USB-Friendly Li-Ion Battery Charger and Power-Path Management IC," SLSU810K, Sep. 2008, Revised Mar. 2015; 49 pages.

\* cited by examiner

METHOD AND CIRCUITRY FOR BATTERY CHARGING USING FEEDBACK VOLTAGES

FIELD OF THE DISCLOSURE

The present disclosure relates generally to battery charger systems and methods, and more particularly to circuitry for battery charging.

BACKGROUND

Battery chargers can be designed to use a constant voltage difference between a voltage provided by a linear regulator that is chosen to be large enough to ensure other portions of the battery charger have the headroom needed for charging the battery. Battery chargers can utilize independent circuit loops to detect a supply voltage provided to the battery charger, an output voltage provided to the battery, the input current of the battery charger, and the input voltage of the battery charger. These loops generate separate reference voltages, and then the terminals providing these outputs are 'Wire ORed' together, e.g., all of the references voltages are provided to the same node to provide the dominant voltage that is used to regulate the voltage provided to the battery. However, this configuration of a battery charger having separate loops with separate reference voltages increases design complexity and difficulty, and by itself can result in the voltage provided by the linear regulating being larger than actually needed for at least portions of the charging period of a batter, thus increasing power consumption.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

In accordance with an embodiment of the present disclosure, battery charger circuitry can utilize linear regulator circuitry and a constant current control loop to provide a charging voltage to a battery as will be better understood with respect to FIGS. 1-6. The battery charger circuitry utilizes feedback loops within the linear regulator to regulate a system voltage, SYS, provided by the linear regulator instead of regulating the charging voltage, BAT, provided to the battery. During an initial configuration, such as during power up/start up, the battery charger circuitry operates in a constant voltage mode that maintains a constant charging voltage BAT at the battery charging output, while the current provided at the battery charging output varies. During the constant voltage mode, the linear regulator provides a variable current at a constant system voltage SYS that is used to provide the charging voltage BAT.

Subsequently, the batter charger switches from the constant voltage mode to a constant current mode that maintains a constant charging current at the battery charging terminal, while the voltage provided at the battery charging output varies. During the constant current mode, the linear regulator provides a variable system voltage, SYS. Thus, during the constant current mode, the variable system voltage SYS can be at reduced levels as needed to maintain the proper voltage offset Vos between the system voltage SYS and the charging voltage BAT provided to the battery to provide the constant charging current at the battery charging terminal, which can reduce power consumption in the battery charger circuitry as compared to other circuitry that only provides a constant system voltage that is well above the proper voltage offset.

Figure 1:
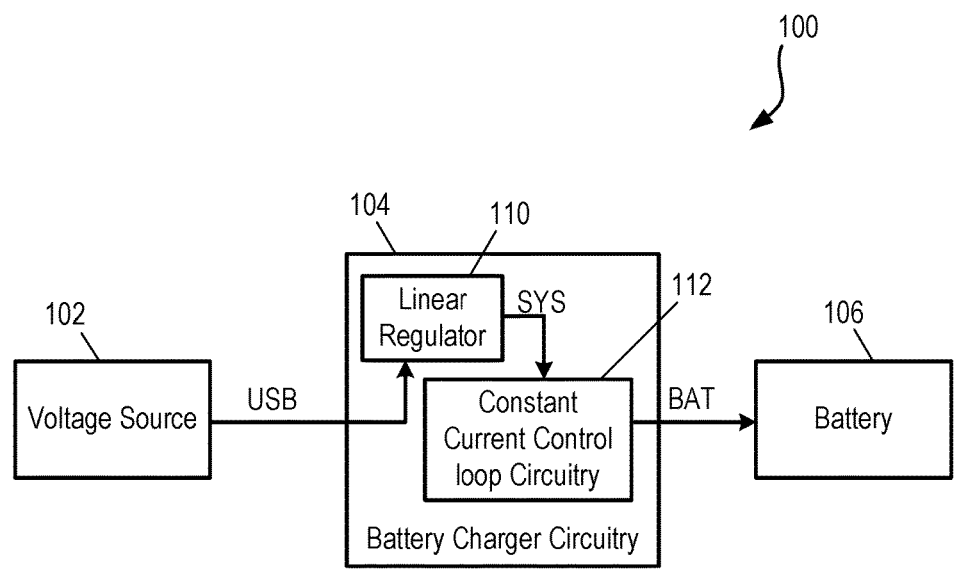
FIG. 1 is a block diagram of a charger system to charge a battery according to at least one embodiment of the present disclosure.

FIG. 1 is a block diagram of a charger system 100 that includes a voltage source 102, battery charger circuitry 104, and a battery 106 according to at least one embodiment of the present disclosure. The battery charger circuitry 104 is connected to both the voltage source 102 to receive an input voltage, USB, and the battery 106 to provide an output voltage BAT. The input voltage, USB, can be any specific voltage level, e.g., 5 V, 10 V, or 12 V capable of allowing proper operation of the linear regulator as described herein. The battery charger circuitry 104 includes linear regulator circuitry 110 and constant current control loop circuitry 112, which together provide the output voltage, BAT, which is also referred to herein as a charging voltage, to the battery 106 as described in greater detail below with respect to FIG. 2. The charging voltage provided to the battery is typically greater than the desired voltage of the battery 106 being charged. For example, if desired voltage of the battery 106 is a 2.8 V, then the charging voltage, BAT, provided to the battery 106 can be 3V, 3.2 V, or the like.

During a constant current mode of operation, the battery charger circuitry 104 provides a variable voltage offset, Vos, between the system voltage, SYS, and the charging voltage, BAT, that remains sufficient to maintain the operation of constant current control loop circuitry 112. For example, while operating in the constant current mode, the battery charger circuitry 104 can vary the system voltage, SYS, provided by the linear regulator 110, which can result in a constant headroom voltage or voltage offset, Vos. This constant headroom voltage, Vos, associated with the constant current mode of operation enables the battery charger circuitry 104 to provide a constant current to the battery 106, instead of a constant voltage typically associated with a batter charger. The amount of headroom or voltage offset, Vos, can be adjusted based on different current control settings of the battery charger circuitry 104 for efficiency consideration, as described in greater detail below. After operating in the constant current mode, the battery charger circuitry 104 can switch to a constant voltage mode as described in greater detail below. For example, while operating in the constant voltage mode, the battery charger circuitry 104 can regulate the system voltage, SYS, provided by the linear regulator 110 instead of regulating the charging voltage, BAT, to a desired constant voltage, CV. This constant voltage level of the system voltage, SYS, can cause the current provided to the battery 106 to vary. The battery charger circuitry 104 can also use an end of charging signal to enter a done state when the current provided to the battery 106 drops below a threshold current, which indicates that the voltage of the battery 106 is finally charged to a desired voltage level as described in greater detail below.

Figure 2:
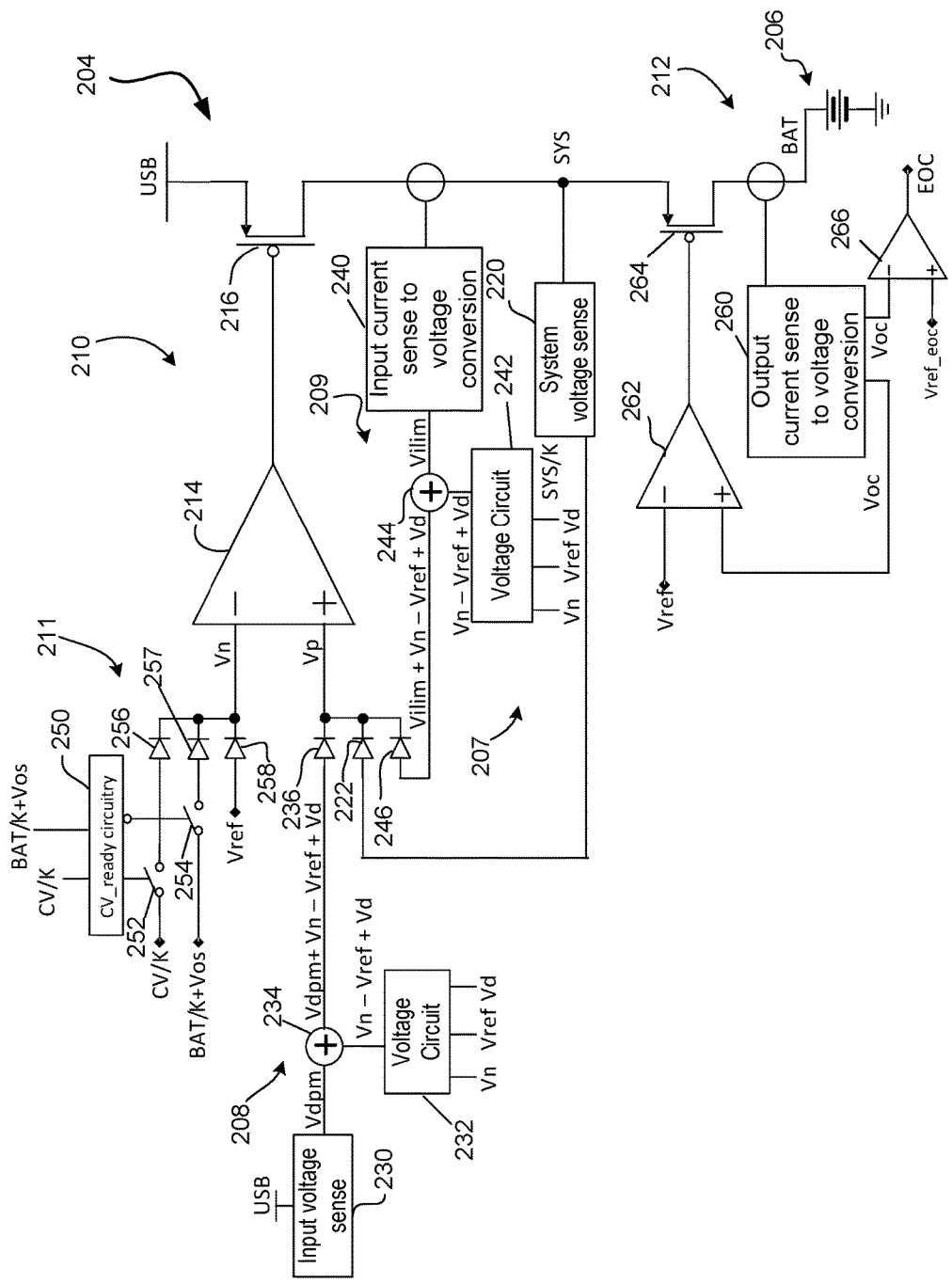
FIG. 2 is a schematic and block diagram of battery charger circuitry of the charger system of FIG. 1 according to at least one embodiment of the present disclosure.

FIG. 2 illustrates battery charger circuitry 204 that is a particular embodiment of the battery charger circuitry 104 of the charger system 100 of FIG. 1. The battery charger circuitry 204 includes linear regulator circuitry 210 and current control loop circuitry 212, which correspond to the linear regulator 110 and control loop circuitry 112 of FIG. 1. The linear regulator 210 includes an amplifier 214, a transistor 216, reference voltage circuitry 211, and various feedback loops, including a system feedback loop 207, a dynamic power management loop 208, and a current limitation loop 209.

The amplifier 214 includes an inverting input terminal, a non-inverting input terminal, and an output terminal. The transistor 216 is illustrated to be a p-mos transistor that includes a first signal electrode connected to an input voltage terminal that receives input voltage, USB, a second signal electrode, and a control electrode. In an embodiment, the input voltage USB is a power supply input voltage that can be any voltage, e.g., 5 volts, 7 volts, or 12 volts, sufficient to allow proper operation of the battery charger circuitry 204. In an embodiment, during periods of high current, the voltage level of the input voltage, USB, received at the input voltage terminal can vary based on parasitic resistances and other characteristics of the line connecting a power supply to the input voltage terminal. These parasitic resistances can cause a voltage drop at the input voltage terminal, which is a voltage drop from the desired input voltage level to an actual voltage level of the input voltage USB received at the input voltage terminal.

The system feedback loop 207 includes system voltage sense circuitry 220 having a first terminal connected to the second signal electrode of the transistor 216, and a second terminal connected to the anode terminal of diode 222. The cathode terminal of diode 222 is connected to the non-inverting terminal of the amplifier 214. The output terminal of amplifier 214 is connected to the control input of transistor 216, thus completing the system feedback loop 207. During operation, the system voltage sense circuitry 220 provides at its output a voltage SYS/K, where SYS is the system voltage, and K is a constant, as described herein.

The dynamic power management loop 208 includes input voltage sense circuitry 230, which has a first terminal connected to the input voltage terminal to receive the input voltage, USB, and a second terminal connected to an input of summing circuitry 234. A second input of the summing circuitry 234 is connected to voltage circuitry 232, and an output of summing circuitry 234 is connected to the anode of diode 236. The cathode of diode 236 is connected to the non-inverting input of amplifier 214, which, as described previously, has an output connected to the control gate of transistor 216. The dynamic power management loop 208 is completed by virtue of the first signal electrode of the transistor 216 and the first input terminal of the input voltage sense circuitry 230 both being connected to the input voltage terminal to receive the input voltage USB. During operation, the input voltage sense circuitry 230 provides at its output a voltage, Vdpm, where Vdpm is a representation of the input voltage USB sensed by the input voltage sense circuitry 230.

The voltage circuitry 232 provides at its output a voltage Vn−Vref+Vd, where Vn is the voltage at the inverting input terminal of amplifier 214, Vref is a reference voltage set by the user, and Vd is a voltage drop across the diodes 222, 236, 246, 256, 257, and 258, as described herein. The summing circuitry 234 provides at its output a voltage Vdpm+Vn−Vref+Vd, as described in greater detail below.

The current limitation loop 209 includes an input current sense to voltage conversion circuitry 240, which has a first terminal connected to the second signal electrode of the transistor 216, and a second terminal connected to an input of a summing circuitry 244. The connection of the first terminal of the input current sense to voltage conversion circuitry 240 to the second signal electrode of the transistor 216 is shown as an open circle to indicate a location where the input current in sensed by the input current sense to voltage conversion circuitry 240. A second input of the summing circuitry 244 is connected to a voltage circuitry 242, and an output of summing circuitry 244 connected to the anode of diode 246. The cathode of diode 246 is connected to the non-inverting input of amplifier 214, which, as described previously, has an output connected to the control gate of transistor 216 to complete the current limitation loop 209. During operation, the input current sense to voltage conversion circuitry 240 provides at its output a voltage, Vilim, where Vilim is a voltage converted from a sense input current by the input current sense to voltage conversion circuitry 240. The voltage circuitry 242 provides at its output a voltage Vn−Vref+Vd similar to that of voltage circuitry 232. The summing circuitry 244 provides at its output a voltage Vilim+Vn−Vref+Vd, as described in greater detail below.

The reference voltage circuitry 211 includes constant voltage ready circuitry 250, switches 252 and 254, and diodes 256, 257, and 258. The constant voltage ready circuitry 250 includes first and second input terminals, and first and second output terminals. The first input terminal to receive a voltage CV/K, where CV is a user desired constant voltage level of the system voltage during the constant voltage mode, and K is user defined constant, as described below. The second input terminal to receive a voltage BAT/K+Vos, where BAT is the charging voltage provided to the battery 206, K is the user defined constant, and Vos is a desired voltage offset value between the system voltage SYS and the charging voltage BAT provided to the battery 206, as described herein. The switch 252 includes a first signal terminal connected to a first voltage reference terminal, a second signal terminal connected to the anode of diode 256, and a control terminal connected to the first output terminal of the constant voltage ready circuitry 250. In an embodiment, the first voltage reference terminal is connected to the voltage CV/K. A cathode terminal of diode 256 is connected to the inverting input of the amplifier 214.

The switch 254 includes a first signal terminal connected to a second voltage reference terminal, a second signal terminal connected to the anode of diode 257, and a control terminal connected to the second output terminal of the constant voltage ready circuitry 250. In an embodiment, the second voltage reference terminal is connected to the voltage BAT/K+Vos. The diode 257 includes a cathode terminal connected to the inverting input of the amplifier 214. A diode 258 includes an anode terminal connected to a third voltage reference Vref, which is a user defined reference voltage, and a cathode terminal connected to the inverting input of the amplifier 214.

The current control loop 212 includes an output current sense to voltage conversion circuitry 260, an amplifier 262, and a p-type transistor 264. The transistor 264 includes a first signal electrode connected to the second signal electrode of the transistor 216, a second signal electrode connected to the battery 206, and a control electrode. The output current sense to voltage conversion circuitry 260 includes a first terminal connected to the second signal electrode of the transistor 264, and second and third output terminals. The connection of the first terminal of the output current sense to voltage conversion circuitry 260 to the second signal electrode of the transistor 264 is shown as an open circle to indicate a location where the output current in sensed by the output current sense to voltage conversion circuitry 240. The amplifier 262 includes a non-inverting input terminal connected to the third terminal of the output current sense to voltage conversion circuitry 260, an inverting input terminal connected to the third reference voltage terminal, which is configure to receive a voltage Vref, and an output terminal connected to the control terminal of the transistor 264. The comparator 266 includes a non-inverting input terminal connected to a fourth reference voltage footage terminal, which is configured to receive a voltage Vref_eoc, which is a voltage representative of when the output current level substantially equals a desired end of charging current level, an inverting input terminal connected to the second terminal of the output current sense to voltage conversion circuitry 260, and an output terminal. During operation, the output current sense to voltage conversion circuitry 260—provides voltage representations, Voc, of the output current being provided from the second signal electrode of the transistor 264 to the battery 206 via a battery terminal. The comparator 266 compares the voltage Voc to the voltage Vref_eoc to determine whether the output current level equals an end of charging current level as described in greater detail below. The amplifier 262 provides at its output a voltage to control the transistor 264 based on the voltages Vref and Voc provided at the input terminal of amplifier 262 as described in greater detail below. The transistor 264 controls an amount of current provided to the battery 206 based on the voltage from amplifier 262 as described in greater detail below.

During operation, the linear regulator 210 can provide a system voltage, SYS, to the constant current control loop 212, wherein the voltage level of the system voltage is controlled by the transistor 216. For example, the more the transistor 216 is turned on, the higher voltage level of the system voltage, SYS. The amplifier 214 utilizes at its inverting input the available highest available reference voltage from diodes 256, 257, and 258 by virtue of the cathodes of diodes 256, 257, and 258 being wire-or'ed together. The amplifier 214 utilizes at its non-inverting input the highest available feedback voltage from diodes 236, 222, and 246, by virtue of the cathodes of diodes 236, 222, and 246 being wire-or'ed together, wherein the voltage at diodes 236, 222, and 246 are based upon voltages provided by the system feedback loop 207, the dynamic power management loop 208, and the current limitation loop 209. As such, amplifier 214 provides an output signal to the control terminal of the transistor 216 to control the system voltage, SYS, provided to the constant current control loop 212.

In an embodiment, the constant voltage ready circuitry 250 controls switches 252 and 254 to provide either the first reference voltage, CV/K, or the second voltage reference, BAT/K+Vos as a voltage to be wire-or'ed with the third voltage reference, Vref via the cathodes of the diodes 256, 257, and 258 being coupled together. In an embodiment, the constant K can be in same for all circuitry that utilize a constant K in generating a particular voltage. In an embodiment, the second output terminal of the constant voltage ready circuitry 250 is inverted as compared to the first output terminal, so that only one of the switches 252 and 254 is closed at a time. Thus, if the constant voltage ready circuitry 250 provides an internal a low voltage cv_ready signal as described below with respect to FIG. 3, switch 252 will be open and switch 254 will be closed. Alternatively, if the constant voltage ready circuitry 250 provides an internal a high voltage cv_ready signal, switch 252 will be closed and switch 254 will be open. One of ordinary skill is the art will recognize that the voltages to open and close switches 252 and 254 can be alternated without varying from the scope of this disclosure. In an embodiment, the low voltage cv_ready signal is provided during the constant voltage mode, and the high voltage cv_ready signal is provided during the constant current mode. The generation of the cv_ready signal and the second voltage reference will be discussed with respect to FIGS. 3 and 4.

Figure 3:
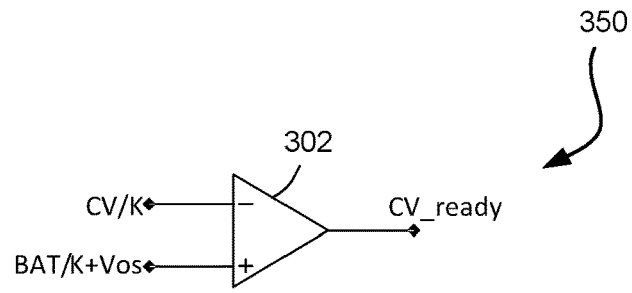
FIG. 3 is a schematic and block diagram of constant voltage ready circuitry of the battery charger circuitry of FIG. 2 according to at least one embodiment of the present disclosure.

Referring now to FIG. 3, a constant voltage ready circuitry 350 generates either a low voltage cv_ready signal or a high voltage cv_ready signal. FIG. 3 illustrates the constant voltage ready circuitry 350 that is a particular embodiment of the constant voltage ready circuitry 250 of the battery charger circuitry 204 of FIG. 2. The constant voltage ready circuitry 350 includes a comparator 302, which in turn includes an inverting input terminal connected to the first voltage reference, CV/K, a non-inverting input terminal connected to the second voltage reference, BAT/K+Vos, and an output terminal.

During operation of the constant voltage ready circuitry 350, if the second reference voltage, BAT/K+Vos, is greater than the first voltage reference, CV/K, then battery charger circuitry 204 is in the constant current mode and a high voltage level is provided as the output signal cv_ready, and switch 252 in FIG. 2 is closed. Alternatively, if the first voltage reference, CV/K, is greater than the second reference voltage, BAT/K+Vos, then battery charger circuitry 204 is in the constant voltage mode and a low voltage level is provided as the output signal cv_ready, and switch 254 in FIG. 2 is closed.

Figure 4:
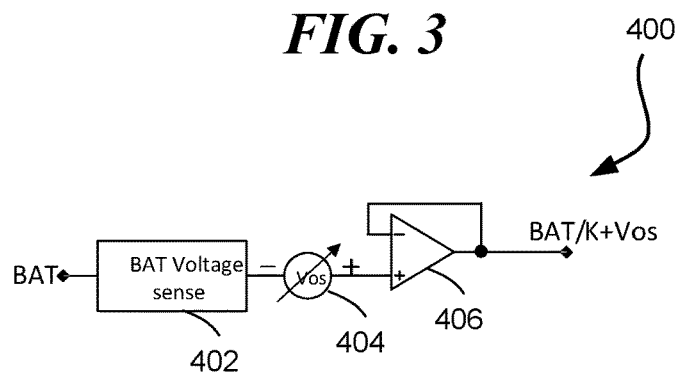
FIG. 4 is a schematic and block diagram of voltage reference circuitry of the battery charger circuitry of FIG. 2 according to at least one embodiment of the present disclosure.

FIG. 4 illustrates voltage generator circuitry 400 to generate the second voltage reference, BAT/K+Vos for the battery charger circuitry 204 of FIG. 2 according to at least one embodiment of the present disclosure. The voltage generator circuitry 400 includes battery voltage sense circuity 402, voltage offset circuitry 404, and amplifier 406. The battery voltage sense circuitry 402 includes an input terminal connected to the charging voltage, BAT, provided to the battery 206, and an output terminal. The voltage offset circuity 404 includes a first terminal connected to the output terminal of the battery voltage sense circuitry 402, and a second terminal. The amplifier 406 includes a non-inverting input terminal connected to the second terminal of the voltage offset circuitry 404, an inverting input terminal, and an output terminal connected to the inverting input terminal.

During operation, the battery voltage sense circuitry 402 divides the voltage BAT by a constant, K, and provides this voltage, BAT/K, to the voltage offset circuitry 404. In an embodiment, the voltage offset circuitry 406 can be implemented by a resistor, with a bias current flowing through the resistor. The voltage offset circuitry 404 adds the voltage offset, Vos, to the voltage BAT/K, received from the battery voltage sense circuitry 402, and thereby provides an charging voltage BAT/K+Vos. The voltage from the voltage offset circuitry 404 is provided to the non-inverting input terminal of the amplifier 406, and the amplifier 406 stabilizes this voltage via the feedback loop from the output terminal to the inverting input terminal. Therefore, the voltage generator circuitry 400 provides the second voltage reference, BAT/K+Vos, based on the charging voltage provided to the battery 206, the predefined constant, K, and the voltage offset, Vos. In an embodiment, the constant K can be amplification value of the amplifier 214, which can set to any value, such as 3, and the voltage offset, Vos, can be a range of values, such as 5V, 0.7V, 1.3V, or the like.

Referring back to FIG. 2, during operation of the linear regulator 210 each of the feedback loops 206, 208, and 210 can provide a different voltage to the non-inverting terminal of the amplifier 214. In particular, the system feedback loop 207 provides a scaled representation, SYS/K, of the system voltage, SYS, to the non-inverting input terminal of the amplifier 214 via the system voltage sense circuitry 220 and diode 222. The voltage, SYS/K, provided by the system feedback loop 207 regulates the output voltage of the amplifier 214 when it is the highest available or dominant voltage provided to the amplifier 214 as compared to the voltage Vdpm+Vn−Vref+Vd, provided to the amplifier 214 by the dynamic power management loop 208, and the voltage Vilim+Vn−Vref+Vd provided to the amplifier 214 by the current limitation loop 209. The voltage SYS/K is provided to the anode of diode 236, the voltage Vdpm+Vn−Vref+Vd is provided to the anode of diode 222, and the voltage Vilim+Vn−Vref+Vd is provided to the anode of diode 246. The highest voltage level of these three voltages is then provided to the non-inverting input terminal of the amplifier 214 by virtue of the cathodes of diodes 236, 222, and 246 being wire-or'ed together.

In an embodiment, the voltage provided by diode 236 is a scaled representation of the input voltage USB, and the scaling is based on a voltage at the inverting input terminal Vn of the amplifier 214, a voltage drop Vd across the diodes, and a user defined reference voltage Vref. Thus, the voltage provided by diode 236 can varying based on whether the battery charger circuitry 204 is in the constant current mode or the constant voltage mode, because different reference voltages are utilized in the different modes of operation. In an embodiment, the user defined reference voltage Vref can generated within the battery charger circuitry 204, such as by a bandgap voltage reference circuit, and can be any voltage, such as 1.2 V, 1.3V, or the like. The voltage provided by the diode 222 can be a scaled representation of a most recent voltage level of the system voltage SYS. The voltage provided by diode 246 is a scaled voltage representing the input current, and the scaling is based on a voltage at the inverting input terminal Vn of the amplifier 214, a voltage drop Vd across the diodes, and a user defined reference voltage Vref. Thus, the voltage provided by diode 246 can varying based on whether the battery charger circuitry 204 is in the constant current mode or the constant voltage mode, because different reference voltages are utilized in the different modes of operation.

In an embodiment, if the dominant (e.g., highest) reference voltage provided to the inverting input terminal of the amplifier 214 is the third voltage reference, Vref, then the system voltage, SYS, provided by the linear regulator 210 is K*Vref. In an embodiment, the anode 258 is coupled to a bandgap voltage reference circuit to receive the reference voltage Vref, which if this voltage is the highest available voltage at the inverting input terminal of the amplifier 214, then the amplifier 214 provides a voltage of K*Vref on its output terminal, where K is the amplification of amplifier 214. The voltage K*Vref can cause the transistor to turn on such that a voltage level at the second signal electrode of the transistor 216, which is defined as the system voltage, SYS, is equal to K*Vref However, if the dominant reference voltage provided to the inverting input terminal of the amplifier 214 is the first voltage reference, CV/K, then the system voltage provided by the linear regulator 210 is the constant voltage, CV. In an embodiment, the first terminal of switch 252 is coupled to voltage reference circuitry within the battery charger circuitry 204 to set a desired constant voltage level for the system voltage, SYS, during the constant voltage mode, and this voltage reference circuitry can scale the desired constant voltage level by the amplification value, K, of the amplifier. The switch 252 receives the reference voltage CV/K and provides this voltage to the anode of diode 256 when switch 252 is closed. If this voltage is the highest available voltage at the inverting input terminal of the amplifier 214, then the amplifier 214 provides a voltage of CV on its output terminal. The voltage CV can cause the transistor to turn on such that a voltage level at the second signal electrode of the transistor 216, which is defined as the system voltage, SYS, is equal to CV during the constant voltage mode.

If the dominant reference voltage provided to the inverting input terminal of the amplifier 214 is the second voltage reference, BAT/K+Vos, then the system voltage provided by the linear regulator 210 is the charging voltage, BAT, provided to the battery 206, plus the offset voltage, Vos, multiplied by the constant K, e.g., BAT+K*Vos. Therefore, the linear regulator 210 can provide sufficient headroom between the system voltage, SYS, and the charging voltage, BAT, provided to the battery 206 during the constant current mode. Thus, switch 252 is closed during the constant voltage mode of the battery charging circuit 204 the reference voltage CV/K to the anode of diode 256, and the switch 254 is closed during the constant current mode of the battery charging circuit 204 to provide the reference voltage BAT/K+Vos to the anode of diode 257.

The dynamic power management loop 208 regulates the actual input voltage, USB, received at the input voltage terminal of the battery charger circuitry 204 to compensate for any voltage drop caused by parasitic resistances on the line from a power supply unit to the input voltage terminal. In an embodiment, when there is input series resistance on the input voltage path from the power supply unit to input voltage terminal that receives the input voltage USB, the high current from input voltage terminal to output voltage SYS from the linear regulator 210 can result in significant voltage drop on the input voltage terminal that receives the input voltage USB. Thus, input voltage sense circuitry 230 senses input voltage and an increase voltage drop can cause the output voltage, Vdpm, of the input voltage sense circuitry 230 to increase. The output voltage, Vdpm, of the input voltage sense circuitry 230 can then be provided to the summing circuitry 234.

In an embodiment, the voltage circuitry 232 provides a voltage, Vcal, to the summing circuitry 234, and that voltage is calculated by the following equation:

$$Vcal = Vn - Vref + Vd \qquad \text{EQ. 1}$$

In EQ. 1 above, Vn is the dominant voltage of Vref, CV/K, BAT/K+Vos provided to the inverting input terminal of the amplifier 214, Vref is the third voltage reference, and Vd is the voltage drop on across diodes 256, 257, and 258. If the dominant reference voltage provided to the anodes of diodes 256, 257, and 258 is the third voltage reference, Vref, then the voltage, Vn, at the inverting input terminal of the amplifier 214 will be Vref−Vd based on the voltage drop from the anode to the cathode of diode 258. In this situation, the voltage circuitry 232 does not provide a voltage to the summing circuitry 234 based on Vn=Vref−Vd. In particular, if Vref−Vd is put in EQ. 1 above, then the voltage provided by the voltage circuitry 232 can be represented by the following equation:

$$Vcal = Vref - Vd - Vref + Vd \qquad \text{EQ. 2}$$

Thus, in this situation, the voltage provided to the non-inverting input terminal of the amplifier 214 via the cathode of the diode 236 is only the voltage, Vdpm, provided from the input voltage sense circuitry 230. In an embodiment, if the voltage, Vdpm, provided from input voltage sense circuitry 230 is greater than the third voltage reference, Vref, then the voltage provided by the amplifier 214 will cause the gate of the transistor 216 to increase, which in turn will decrease the current provided by the linear regulator 210. The decrease in the current provided by the linear regulator 210 can then enable the input voltage, USB, to recover to the intended voltage level.

In an embodiment, if the dominant reference voltage provided to the anodes of the diodes 256, 257, and 258 is the first voltage reference, CV/K, then the voltage, Vn, at the inverting terminal of the amplifier 214 will be CV/K−Vd based on the voltage drop from the anode to the cathode of diode 256. Thus, using Vn=CV/K−Vd in EQ. 1 for the voltage, Vcal, provided by the voltage circuitry 232 can be represented by the following equation:

$$Vcal = CV/K - Vd - Vref + Vd \qquad \text{EQ. 3}$$

In this situation, the voltage provided to the non-inverting input terminal of the amplifier 214 via diode 236 is Vdpm+CV/K−Vref.

In an embodiment, the current limitation loop 209 regulates the input current of the transistor 216. During constant current mode operation, the input current sense to voltage conversion circuitry 240 senses the current of the transistor 216 and converts the current to a voltage, Vilim. Thus, as the current of transistor 216 increases, the voltage, Vilim, provided from the input current sense to voltage conversion circuitry 240 also increases. In an embodiment, the voltage circuitry 242 provides a voltage to the summing circuitry 244, in substantially the same manner as voltage circuitry 232. Thus, the voltage provided by the voltage circuitry 242 can be zero if Vref is the dominant reference voltage provided as Vn to the inverting input terminal of the amplifier 214. Thus, in this situation, the voltage provided to the non-inverting input terminal of the amplifier 214 via the diode 246 is the voltage, Vilim, provided from the input current sense to voltage conversion circuitry 240.

In an embodiment, if the voltage, Vilim, provided from the input current sense to voltage conversion circuitry 240 is greater than the third voltage reference, Vref, then the gate of transistor 216 will increase, which in turn causes the current through the transistor 216 to decrease. When the current limitation loop 209 reaches a regulated state with an expected current, then the voltage, Vilim, provided from the input current sense to voltage conversion circuitry 240 will be equal to the third reference voltage, Vref.

In an embodiment, the current control loop 212 regulates the current provided to the battery 206. During operation of the current control loop 212, the transistor 264 is the main transistor to step down the system voltage, SYS, from the linear regulator 210 to the desired charging voltage, BAT, to be provided to the battery 206. The output current sense to voltage conversion circuitry 260 senses the current provided to the battery 206, and converts the sense current to voltage that is then provided to the non-inverting input terminal of the amplifier 262. In an embodiment, if the current provided to the battery 206 increases, then the voltage provided from the output current sense to voltage conversion circuitry 260 to the amplifier 262 also increases, which in turn increases a voltage provided by the amplifier 262. Thus, an increase in the current provided to the battery 206 can cause the gate of the transistor 264 to increase, which in turn will decrease the current provided to the battery 206 so that the charging current will be stabilized.

The output current sense to voltage conversion circuitry 260 also provides the voltage converted from the sensed current to inverting input terminal of the comparator 266, which in turn compares the converted voltage to the end of charging reference voltage, Vref_eoc. In an embodiment, the end of charging reference voltage, Vref_eoc, can be any voltage such as 1.1 V, 1.2 V, or 1.3 V. When converted voltage is lower than the end of charging reference voltage, Vref_eoc, the comparator 266 generates an end of charging (EOC) signal for digital.

Figure 5:
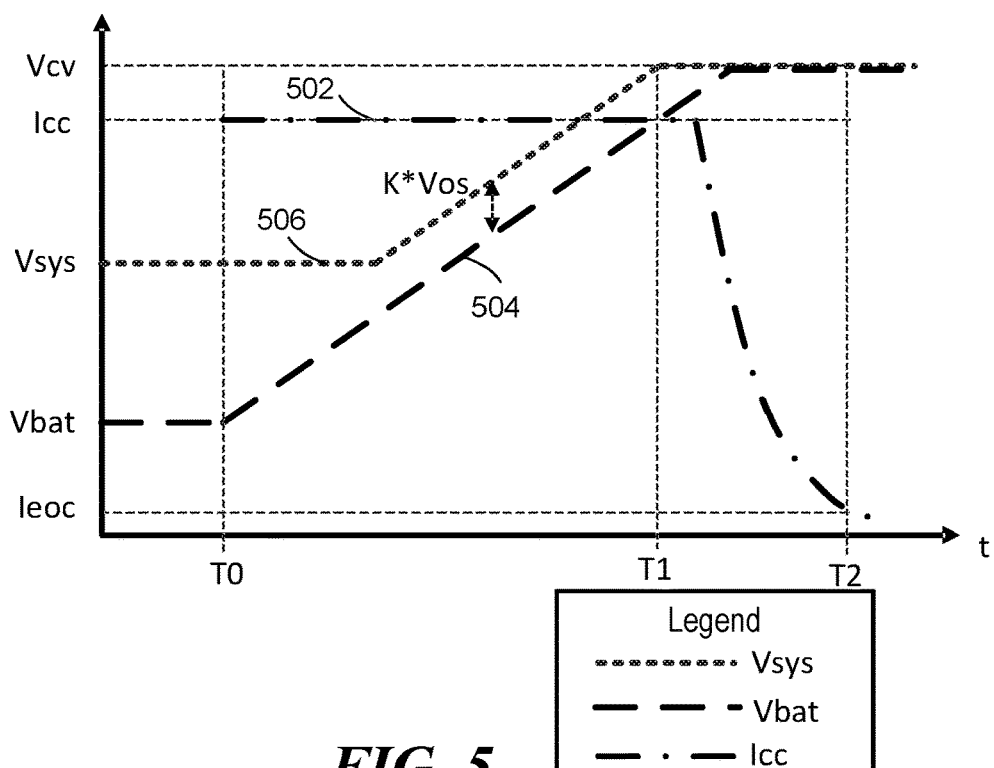
FIG. 5 is an illustration of voltage and current levels within the battery charger circuitry of FIG. 2 at different times of operation according to at least one embodiment of the present disclosure.

The overall operation of the battery charger circuitry 204 will now be described with respect to FIGS. 2 and 5. FIG. 5 illustrates of waveforms 502, 504, and 506 representing voltage and current levels within the battery charger circuitry 204 of FIG. 2 according to at least one embodiment of the present disclosure. Assuming that in an initial configuration of the battery charger circuitry 204, the second voltage reference, BAT/K+Vos, is less than the third voltage reference, Vref, then the system voltage, SYS, provided from the linear regulator 210 will be regulated based on K*Vref, and the feedback loops (e.g., the system feedback loop 207, the dynamic power management loop 208, and the current limitation loop 209) will provide voltages to the non-inverting input terminal of the amplifier 214 as described above. In an embodiment, the constant, K, can be the amplification of the amplifier 214 and can be set to any value, such as 3, 4, or 5. In an embodiment, the third reference voltage, Vref, can be any voltage, such as 1.2 V, 1.3 V, or 1.4 V.

At an initial configuration, such as time T0, battery charger circuitry 204 is completed a start up mode, and enters a constant current mode. In this mode, the charging voltage, BAT, provided to the battery 206 will be charged with constant current, Icc, as represented by waveform 502 of FIG. 5, and the voltage, Vbat, of the battery 206 will increase, as shown by waveform 504 of FIG. 5. When second voltage reference, BAT/K+Vos, is higher than the third voltage reference, Vref, the system voltage, SYS, provided from the linear regulator 210 will be regulated at BAT+K*Vos and the system voltage, SYS, will rise up, as represented by waveform 506 of FIG. 5, with the charging voltage, BAT, provided to the battery 206. Now voltage difference between the system voltage, SYS, and the charging voltage, BAT, is a constant value, K*Vos.

At a next point, such as time T1, when the second voltage reference, BAT/K+Vos, is greater than the first voltage reference, CV/K, the comparator 302 will provide a high voltage CV_ready signal within the cv_ready circuitry 250, and as result the switch 252 is opened and switch 254 is closed. At this point, the first voltage reference, CV/K, will be higher than the third voltage reference, Vref, and will be the dominant reference voltage, Vn, at the inverting input terminal of the amplifier 214. The system feedback loop 207 will cause the system voltage, SYS, provided by the linear regulator 210 to be regulated at constant voltage, CV, as represented by waveform 506.

In response to the system voltage, SYS, provided by the linear regulator 210 being regulated at constant voltage, CV, the battery charger circuitry 204 will enter a constant voltage mode. While the battery charger circuitry 204 is in the constant voltage mode the charging voltage, BAT, provided to the battery 206 can continue to increase. At this point in time, a difference between the system voltage, SYS, of the linear regulator 210 and charging voltage, BAT, provided to the battery 206 starts to decrease as represented by waveforms 504 and 506 of FIG. 5.

When the difference is too small to provide a constant current, Icc, to the battery 206, the constant current loop 104 will regulate the gate of transistor 264, such that the voltage drop across the transistor 264 will be substantially equally to 0V. Then the charging current will decrease if the system voltage, SYS, of the linear regulator 210 minus the charging voltage, BAT, provided to the battery 206 is less than the constant current, Icc, multiplied by resistance of the transistor 264 in the on state, Rdson, which can be expressed with the following equation:

$$SYS-BAT<Icc*Rdson \qquad \text{EQ. 4}$$

During a time period from time T0 to time T1, the system voltage, SYS, provided by the linear regulator 210 can be regulated to be the amplification K of the amplifier 214 multiplied by the voltage offset Vos, K*Vos, higher than the charging voltage, BAT, provided to the battery 206 to ensure there is enough headroom between these two voltages, to provide a constant current, Icc, for charging the battery. In an embodiment, the offset voltage, Vos, can be adjusted higher with a higher charging current, Icc, setting.

At the point time T2, when charging current, Icc, is less than an end of charging current, Ieoc, charger will enter an end of charging (EOC) state and starts a digital timer. In an embodiment, the comparison of the charging current, Icc, to the end of charging current, Ieoc, can be implemented based on the comparison of the voltage from the output current sense to voltage conversion circuitry 260 compared with the end of charging voltage, Veoc, by the comparator 266.

After time T2, as transistor 264 has been already fully turned on and Rdson is small, the charging voltage, BAT, provided to the battery 206 will be very close to system voltage, SYS, provided by the linear regulator 210. In an embodiment, the value Rdson can be a parasitic resistance within the transistor 264 when the transistor is turned on. In an embodiment, if the end of charging current, Ieoc, is set as 1 mA, then a voltage difference between the charging voltage, BAT, provided to the battery 206 and a constant voltage, CV, setting can be ignored when end of charging is reached. After the digital timer expires, the battery charger circuitry 204 will enter a DONE state and stop providing a charging voltage, BAT, to the battery 206.

Thus, the battery charger circuitry 204 utilizes the feedback loops (e.g., the system feedback loop 207, the dynamic power management loop 208, and the current limitation loop 209) to regulate the system voltage, SYS, provided by the linear regulator 210 instead of regulating the charging voltage, BAT, provided to the battery 206. The battery charger circuitry 204 utilizes an EOC signal to enter DONE state so that the charging voltage, BAT, provided to the battery 206 is finally charged to the constant voltage, CV. In an embodiment, the accuracy of the charging voltage, BAT, provided to the battery 206 reaching the constant voltage, CV, is dependent on the charging voltage, BAT, provided to the battery 206, Rdson of the transistor 264, and end of charging current, Ieoc.

For example, an accurate voltage of battery will be the constant voltage, CV, minus the voltage drop of the transistor 264, which can be represented by Rdson*Ieoc. If the end of charging current, Ieoc, is set as low as possible, then a higher constant voltage can utilized, e.g., CV=4.2V. In an embodiment, if the CV=4.2 V, Rdson=50 mohm, EOC=5 mA, then the real battery voltage after EOC is time out is, 4.2 V−50 mohm*5 mA=4.2 V−250 uV. In this embodiment, the delta between this actual voltage of the battery 206 and constant voltage setting could be ignored.

Figure 6:
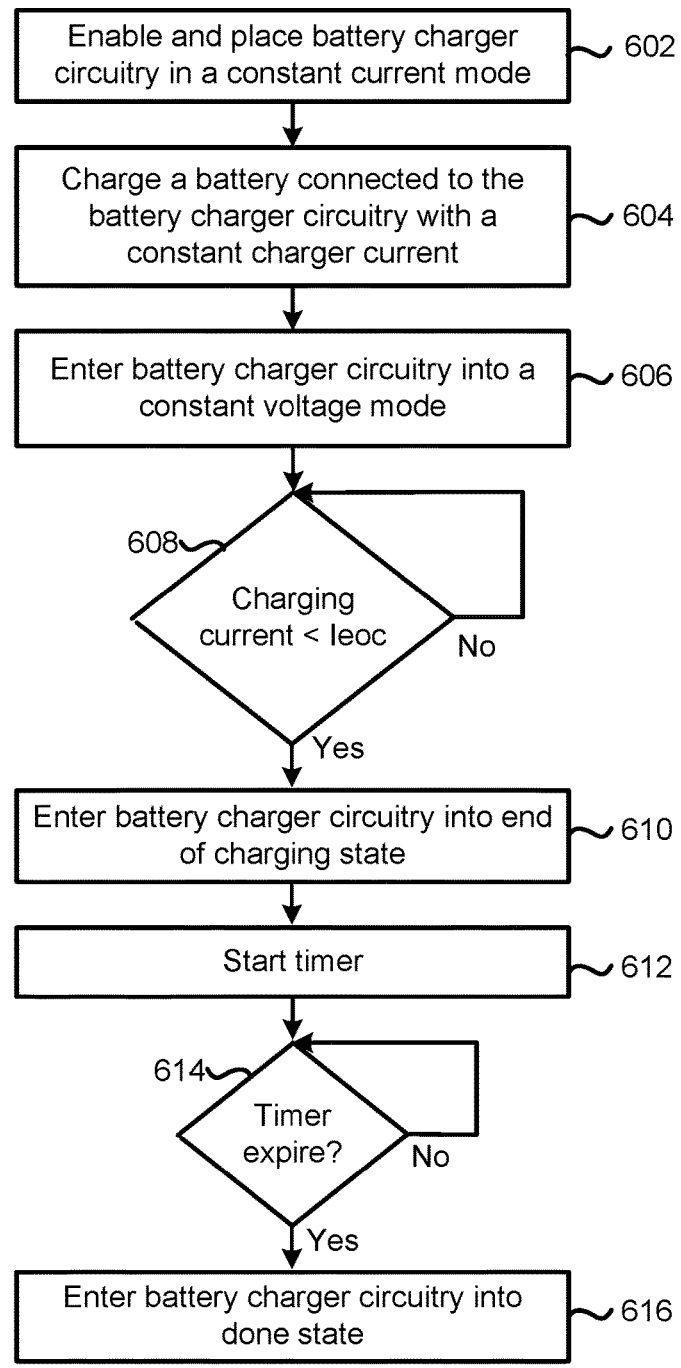
FIG. 6 is a flow diagram of a method for charging a battery using the battery charger circuitry of FIG. 2 according to at least one embodiment of the present disclosure.

FIG. 6 is a flow diagram of a method for charging a battery using the battery charger circuitry of FIG. 2 according to at least one embodiment of the present disclosure. At block 602, battery charger circuitry is enabled and placed in a constant current mode. A battery connected to the battery charger circuitry is charged with a constant charging current at block 604. At block 606, the battery charger circuitry is entered into a constant voltage mode.

At block 608, a determination is made whether the charging current provided to the battery is less than an end of charging reference current. When the charging current is less than an end of charging reference current, the battery charger circuitry is entered into an end of charging state at block 610. At block 612, a timer is started. A determination is made whether the timer has expired at block 614. When the timer has expired, the battery charger circuitry is entered into a done state at block 616.

In a first aspect, a method includes placing battery charger circuitry into a current control mode. The method also includes charging a battery connected to the battery charger circuitry with a constant current. The method further includes placing the battery charger circuitry into a constant voltage mode. The method also includes determining whether a charging current provided to the battery is less than an end of charging reference current. The method further includes in response to the charging current being less than the end of charging reference current, placing the battery charger circuitry into an end of charging state and to start a timer. The method also includes in response to the timer expiring, placing the battery charger circuitry into a done state to end charging of the battery.

In an embodiment, the method further includes regulating, via a current limitation loop of the battery charger circuitry, an input current of a transistor of a linear regulator of the battery charger circuitry. In an embodiment, the method further includes regulating, via a dynamic power management loop of the linear regulator of the battery charger circuity, an input voltage provided to the transistor. In an embodiment, the method further includes receiving, at an inverting input terminal of an amplifier, a dominant reference voltage. In this embodiment, the method also includes receiving, at a non-inverting input terminal of the amplifier, a dominant feedback voltage of a plurality of feedback voltages at the non-inverting input terminal.

In an embodiment, the method further includes placing the battery charger circuitry into the voltage control mode during power up of the battery charger circuity and prior to placing the battery charger circuity in the current control mode. In an embodiment, the method further includes comparing a converted voltage to an end of charging reference voltage. In this embodiment, the method also includes providing an end of charging signal in response to the converted voltage being less than the end of charging reference voltage. In an embodiment, the method further includes sensing a charging current provided to the battery. In this embodiment, the method also includes converting the sensed charging current into the converted voltage. In this embodiment, the method further includes providing the converted voltage to the comparator.

In a second aspect, battery charger circuitry includes a linear regulator, which in turn includes an amplifier, a first transistor, and a current control loop. The amplifier includes an inverting input terminal, a non-inverting input terminal, and an output terminal. The amplifier to receive a dominant reference voltage from one of a first plurality of sources at the inverting input terminal from one of a second plurality of sources, and to receive a dominant feedback voltage at the non-inverting input terminal.

The first transistor includes a first signal electrode coupled to an input voltage terminal to receive an input voltage, a second signal electrode, and a control electrode coupled to the output terminal of the amplifier. The first transistor to provide a first output voltage based on a signal from the amplifier, and the input voltage. The current control loop includes a second transistor, which in turn includes a first signal electrode coupled to the second signal electrode of the first transistor, a second signal electrode coupled to a battery, and a control electrode. The second transistor to provide a second output voltage to the battery, the current control loop to regulate current provided to the battery when the battery charger circuitry is in a current control mode.

In an embodiment, the current control loop further includes a comparator to compare a converted voltage to an end of charging reference voltage, and to output an end of charging signal in response to the converted voltage being less than the end of charging reference voltage. In an embodiment, the current control loop also includes an output current sense to voltage conversion circuitry to sense a charging current provided to the battery, to convert the sensed charging current into the converted voltage, and to provide the converted voltage to the comparator. In an embodiment, the current control loop to start a timer in response to the end of charging signal, and in response to the timer expiring to enter the battery charger circuitry into a done state.

In an embodiment, the linear regulator further includes a current limitation loop coupled to the second signal electrode of the first transistor, and to the non-inverting input terminal of the amplifier, the current limitation loop to regulate an input current of the first transistor. In an embodiment, the linear regulator also includes a dynamic power management loop coupled to the second signal electrode of the first transistor, the dynamic power management loop to regulate an input voltage provided to the first transistor. In an embodiment, the dominant feedback voltage is provided by one of a plurality of feedback loops in a linear regulator of the battery charger circuitry.

In a third aspect, battery charger circuitry to operate in a current control mode and in a constant voltage mode. The battery charger circuitry includes a linear regulator and a current control loop. The linear regulator to provide a constant current to a battery being charged while the battery charger circuitry is in the current control mode. The current control loop coupled to the linear regulator. In an embodiment, the current control loop to: while the battery charger circuitry is in the constant voltage mode: determine whether a charging current provided to the battery is less than an end of charging reference current; in response to the charging current being less than the end of charging reference current, to place the battery charger circuitry into an end of charging state, and to start a timer; and in response to the timer expiring, to enter the battery charger circuitry into a done state to end charging of the battery.

In an embodiment, the battery charger circuitry further includes a current limitation loop to regulate an input current of a transistor of a linear regulator of the battery charger circuitry. In an embodiment, the linear regulator further includes a dynamic power management loop to regulate an input voltage provided to the transistor. In an embodiment, the battery charger circuitry further includes an amplifier including an inverting input terminal to receive a dominant reference voltage, and a non-inverting input terminal to receive a dominant feedback voltage at the non-inverting input terminal. In an embodiment, the dominant feedback voltage is provided by one of a plurality of feedback loops in a linear regulator of the battery charger circuitry. In an embodiment, the current control loop further to compare a converted voltage to an end of charging reference voltage, and to output an end of charging signal in response to the converted voltage being less than the end of charging reference voltage.

Those skilled in the art will appreciate that other embodiments are possible within the scope of the present disclosure. For example, rising and falling transitions of clock signals can be replaced with falling and rising transitions, respectively, and the clocking of latches within a storage element can be reversed. Such a system will have an equivalent logical operation to the examples described previously.

As another example, a synchronous digital system can use storage elements in which latches of are clocked only by, for example, falling clock transitions. In such a system, two successive falling transitions of a single clock signal are required to latch input values and present new output values at storage elements. A reference clock in this system is thus twice as long as a reference clock in a system using both falling and rising clock transitions.

As a further example, a synchronous digital system can use different clock signals for the first and second latches in storage elements. Clock signals must be generated that cause all first latches to latch input values before any second latch is clocked to present an output value.

What is claimed is:
1. A method comprising:
placing battery charger circuitry into a current control mode;
while in the current control mode, charging a battery connected to the battery charger circuitry with a constant current;
maintaining the constant current by controlling a gate of a transistor of a linear regulator with the output of an amplifier, the amplifier having an inverting input and a non-inverting input;
receiving a dominant feedback voltage at the non-inverting input of the amplifier, the dominant feedback voltage selected from a plurality of feedback voltages;
placing the battery charger circuitry into a constant voltage mode;
while in the constant voltage mode, determining whether a charging current provided to the battery is less than an end of charging reference current;
in response to the charging current being less than the end of charging reference current, placing the battery charger circuitry into an end of charging state and to start a timer; and
in response to the timer expiring, placing the battery charger circuitry into a done state to end charging of the battery.

2. The method of claim 1, further comprising:
providing the second voltage of the plurality of feedback voltages via a dynamic power management loop of the battery charger circuitry.

3. The method of claim 1, further comprising:
receiving, at the non-inverting input terminal of the amplifier, a dominant feedback voltage of a plurality of feedback voltages at the non-inverting input terminal.

4. The method of claim 1, further comprising:
placing the battery charger circuitry into the voltage control mode during power up of the battery charger circuity and prior to placing the battery charger circuity in the current control mode.

5. The method of claim 1, further comprising:
comparing a converted voltage to an end of charging reference voltage; and
providing an end of charging signal in response to the converted voltage being less than the end of charging reference voltage.

6. The method of claim 5, further comprising:
sensing a charging current provided to the battery;
converting the sensed charging current into the converted voltage; and
providing the converted voltage to the comparator.

7. The method of claim 1, further comprising a first voltage of the plurality of feedback voltages having a value based on the sum of a voltage representing a current at an output terminal of the transistor, a voltage at the inverting input of the amplifier, a reference voltage, and a voltage drop across a diode.

8. The battery charger circuitry of claim 7, further comprising:
a current limitation loop to provide the third feedback voltage.

9. The battery charger circuitry of claim 7, wherein the linear regulator further comprises:
a dynamic power management loop to provide the first feedback voltage.

10. The method of claim 7, further comprising a second voltage of the plurality of feedback voltages having a value based on the sum of a voltage at the inverting input of the amplifier, a representation of an input voltage to the battery charger circuitry, the voltage drop across the diode and the negative of a constant reference voltage.

11. Battery charger circuitry comprising:
a linear regulator comprising:
an amplifier comprising an inverting input terminal, a non-inverting input terminal, and an output terminal, the amplifier to receive a dominant reference voltage from one of a first plurality of sources at the inverting input terminal and to receive a dominant feedback voltage from one of a second plurality of sources at the non-inverting input terminal;
a first transistor comprising a first signal electrode coupled to an input voltage terminal to receive an input voltage of the battery charger, a second signal electrode, and a control electrode coupled to the output terminal of the amplifier, the first transistor to provide a first output voltage based on a signal from the amplifier, and the input voltage; and
a current control loop, the current control loop comprising:
a second transistor comprising a first signal electrode coupled to the second signal electrode of the first transistor, a second signal electrode coupled to a battery, and a control electrode, the second transistor to provide an output current to the battery and a second output voltage to the battery, the current control loop to regulate current provided to the battery when the battery charger circuitry is in a current control mode.

12. The battery charger circuitry of claim 11, the current control loop further comprises:
a comparator to compare a converted voltage to an end of charging reference voltage, and to output an end of charging signal in response to the converted voltage being less than the end of charging reference voltage.

13. The battery charger circuitry of claim 12, the current control loop further comprises:
an output current sense to voltage conversion circuitry to sense a charging current provided to the battery, to convert the sensed charging current into the converted voltage, and to provide the converted voltage to the comparator.

14. The battery charger circuitry of claim 12, the current control loop to start a timer in response to the end of charging signal, and in response to the timer expiring to enter the battery charger circuitry into a done state.

15. The battery charger circuitry of claim 11, the linear regulator further comprising:
a current limitation loop having an input coupled to the second signal electrode of the first transistor and an output coupled to the non-inverting input terminal of the amplifier, the current limitation loop to regulate an input current of the first transistor.

16. The battery charger circuitry of claim 11, the linear regulator further comprising:
a dynamic power management loop coupled to the second signal electrode of the first transistor, the dynamic power management loop to regulate an input voltage provided to the first transistor.

17. The battery charger circuitry of claim 11, wherein the dominant feedback voltage is provide by one of a plurality of feedback loops in a linear regulator of the battery charger circuitry.

18. Battery charger circuitry to operate in a current control mode and in a constant voltage mode, the battery charger circuitry comprising:
a linear regulator to provide a constant current to a battery being charged while the battery charger circuitry is in the current control mode, the linear regulator comprising an amplifier, the amplifier including:
an inverting input terminal to receive a dominant reference voltage; and
a non-inverting input terminal to receive a dominant feedback voltage at the non-inverting input terminal; and
a current control loop coupled to the linear regulator, the current control loop to:
while the battery charger circuitry is in the constant voltage mode:
determine whether a charging current provided to the battery is less than an end of charging reference current;
in response to the charging current being less than the end of charging reference current, to place the battery charger circuitry into an end of charging state, and to start a timer; and
in response to the timer expiring, to enter the battery charger circuitry into a done state to end charging of the battery;
wherein the dominant reference voltage is a maximum voltage of a plurality of reference voltages, the plurality of reference voltages including:

a first reference voltage based on a constant reference voltage;

a second reference voltage based on a voltage of the battery scaled by a gain of the amplifier and added to an offset voltage; and a third reference voltage based on a voltage supplied to the battery during the constant voltage mode scaled by the gain of the amplifier.

19. The battery charger circuitry of claim 18, the current control loop further to compare a converted voltage to an end of charging reference voltage, and to output an end of charging signal in response to the converted voltage being less than the end of charging reference voltage.

20. The battery charger circuitry of claim 18, wherein the dominant feedback voltage is a maximum voltage of a plurality of feedback voltages, the feedback voltages including:

a first feedback voltage based on the sum of a voltage at the inverting input of the amplifier, a representation of an input voltage to the battery charger circuitry, a voltage drop across a diode and the negative of the constant reference voltage;

a second feedback voltage based on a system voltage scaled by the gain of the amplifier; and a third feedback voltage based on the sum of a voltage at the inverting input of the amplifier, a representation of the current provided by the linear regulator, a voltage drop across a diode and the negative of the constant reference voltage.

\* \* \* \* \*